(12) United States Patent
Kaufman et al.

(10) Patent No.: US 11,035,735 B2
(45) Date of Patent: *Jun. 15, 2021

(54) SPHERICAL DETECTOR ARRAYS IMPLEMENTED USING PASSIVE DETECTOR STRUCTURES FOR THERMAL IMAGING APPLICATIONS

(71) Applicant: DIGITAL DIRECT IR, INC., Fresh Meadows, NY (US)

(72) Inventors: Peter N. Kaufman, Fresh Meadows, NY (US); Howard E. Carpenter, Carmel, NY (US)

(73) Assignee: DIGITAL DIRECT IR, INC., Fresh Meadows, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 16/241,593

(22) Filed: Jan. 7, 2019

(65) Prior Publication Data

US 2019/0137344 A1    May 9, 2019

Related U.S. Application Data

(63) Continuation of application No. 15/523,343, filed as application No. PCT/US2015/058171 on Oct. 29, 2015, now Pat. No. 10,175,114, which is a continuation-in-part of application No. 14/677,954, filed on Apr. 2, 2015, now Pat. No. 9,523,612.

(60) Provisional application No. 62/072,399, filed on Oct. 29, 2014.

(51) Int. Cl.
*G01J 5/44* (2006.01)
*G01J 5/02* (2006.01)
*H04N 5/33* (2006.01)
*G01J 5/00* (2006.01)

(52) U.S. Cl.
CPC ............... *G01J 5/44* (2013.01); *G01J 5/0205* (2013.01); *H04N 5/33* (2013.01); *G01J 2005/0077* (2013.01)

(58) Field of Classification Search
CPC .... G01J 5/44; G01J 5/0205; G01J 2005/0077; H04N 5/33
See application file for complete search history.

(56) References Cited

U.S. PATENT DOCUMENTS

| 6,336,366 | B1* | 1/2002 | Thundat | G01H 3/08 |
| | | | | 310/331 |
| 2008/0316462 | A1* | 12/2008 | Riel | G01C 3/00 |
| | | | | 356/3 |
| 2013/0214158 | A1* | 8/2013 | Kaufman | G01J 5/046 |
| | | | | 250/338.1 |
| 2015/0161779 | A1* | 6/2015 | Hamann | H04N 5/23238 |
| | | | | 348/165 |
| 2016/0219228 | A1* | 7/2016 | Kintz | G02B 5/1842 |
| 2016/0366346 | A1* | 12/2016 | Shin | G06T 7/254 |

* cited by examiner

*Primary Examiner* — Blake C Riddick

(57) ABSTRACT

Spherical detector array devices are provided, which are implemented using passive detector structures for thermal imaging applications. Passive detector structures are configured with unpowered, passive front-end detector structures with direct-to-digital measurement data output for detecting incident photonic radiation in the thermal IR portion of the electromagnetic spectrum.

19 Claims, 15 Drawing Sheets

1600

1700

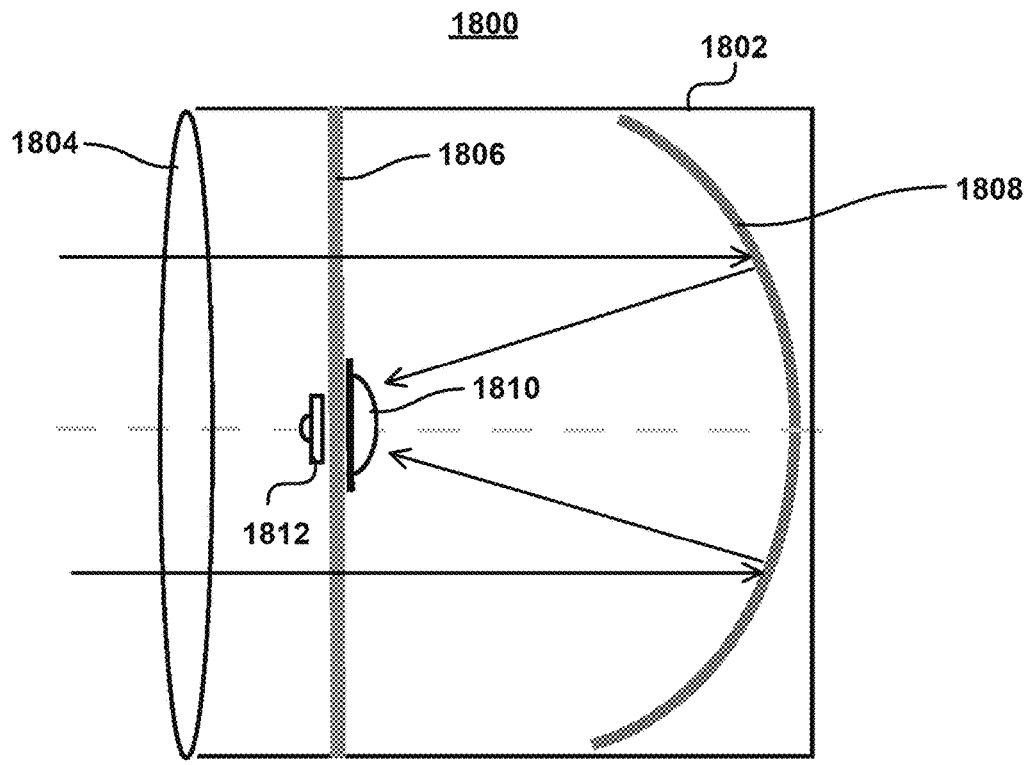
FIG. 18A
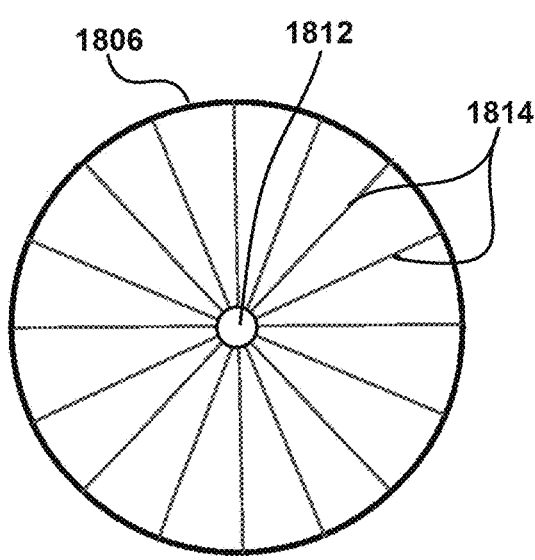 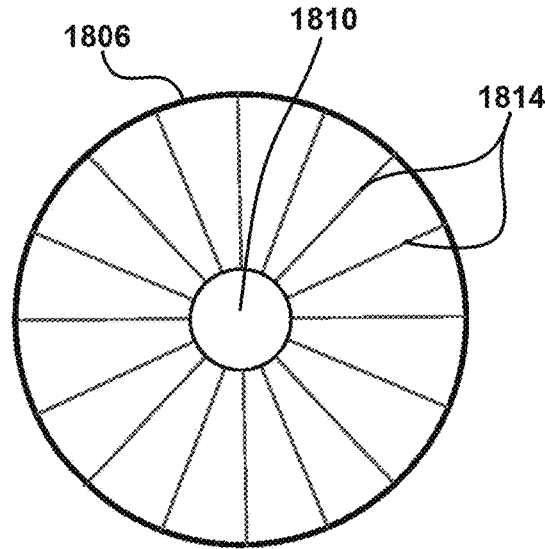
FIG. 18B        FIG. 18C

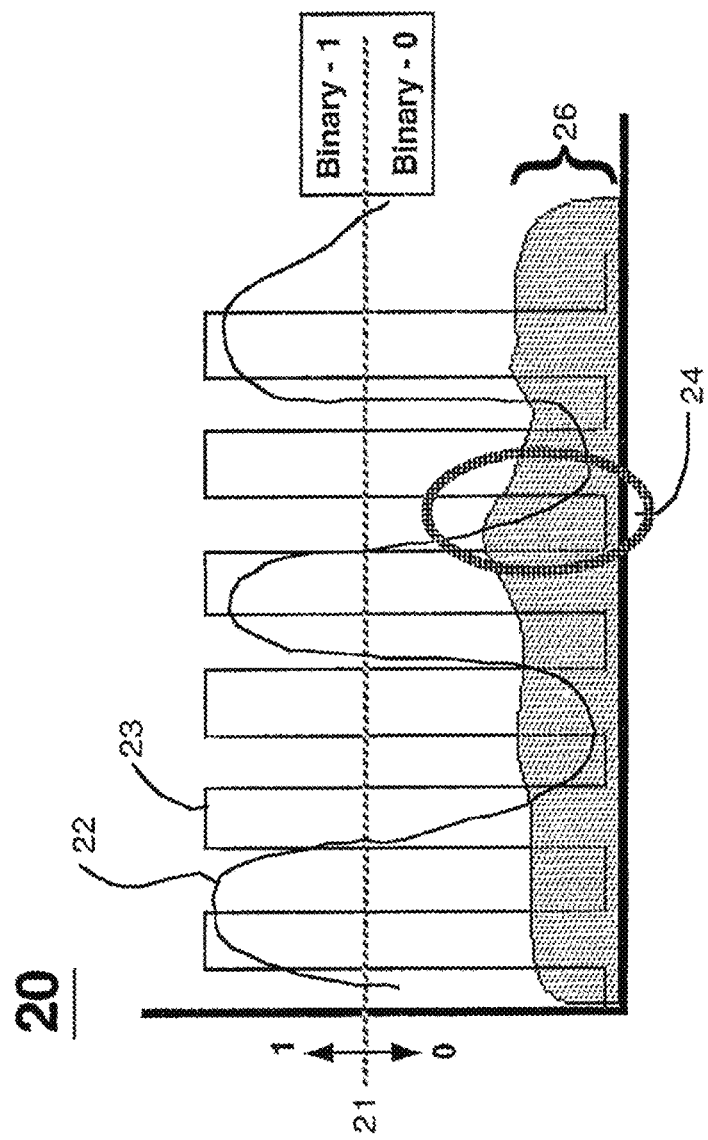

SPHERICAL DETECTOR ARRAYS IMPLEMENTED USING PASSIVE DETECTOR STRUCTURES FOR THERMAL IMAGING APPLICATIONS

TECHNICAL FIELD

The field generally relates to photon detector structures, photon detector arrays, and imaging systems and methods.

BACKGROUND

Conventional imager technologies use quantum and analog detectors, which are complicated to design, build and contain inherent fabrication and performance problems that are difficult and expensive to resolve. These detectors can only detect a small segment of the IR spectrum, either 4 µm or 10 µm (mid or far IR respectively), which is dependent on the detector material selected, the detector design and size. Some disadvantages and limitations of current IR technology are as follows.

The quantum semiconductor technologies have highly complex intricate structures. For example, each pixel has a multitude of nano-sized structures, which makes them difficult to fabricate, and expensive to produce. Moreover, multiple stages contribute noise which limits performance, and improving performance is complex and redesigns are expensive. The complexity requires high-end fabrication facilities and foundries. All these factors contribute to the imagers high cost. The imager designs are limited to one narrow segment of the IR spectrum, either 4µ or 10µ individually. The analog signal has to be converted to digital (A/D) before it can be made into a video image. The instability and noise of analog systems is a big problem and limits performance.

The design of optical systems for digital cameras is complicated by the requirement that the image surface be planar, which results in complex and expensive optics. Research in the design of simple and compact camera systems with curved detector arrays has not resulted in practical, low-cost techniques to realize such curved detector arrays. Conventional technologies are not capable of producing high-quality curved semiconductor substrates that are suitable for building photodetector arrays and creating patterned circuits on such curved substrates.

SUMMARY

Embodiments of the invention generally include spherical detector arrays that are implemented using passive detector structures for thermal imaging applications.

In one embodiment, an imaging device includes a substrate comprising a plurality of different levels of concentric step structures that are disposed at different heights to emulate a spherical surface. Each concentric step structure includes one or more thermal infrared detectors formed thereon. In alternative embodiments of the invention, the concentric step structures may comprise one of (i) square-shaped concentric step structures which emulate a convex shaped spherical surface, (ii) circular-shaped concentric step structures which emulate a convex shaped spherical surface, (iii) square-shaped concentric step structures that emulate a concave shaped spherical surface, and (iv) circular-shaped concentric step structures that emulate a concave shaped spherical surface.

In one embodiment, each thermal infrared detector comprises: a piezoelectric resonator member formed of a piezoelectric material that is configured to molecularly resonate in response to a drive voltage and generate an output signal having a frequency or period of oscillation; an electrically unpowered detector member, wherein the electrically unpowered detector member is configured for exposure to incident thermal infrared radiation, wherein the electrically unpowered detector member comprises a material having a thermal coefficient of expansion that causes the electrically unpowered detector member to distort due to absorption of said incident thermal infrared radiation, wherein the electrically unpowered detector member is further configured to apply a mechanical force to the piezoelectric resonator member due to said distortion of the electrically unpowered detector member, and cause a change in a frequency or period of oscillation of the output signal generated by the piezoelectric resonator member due to said mechanical force applied to the piezoelectric resonator member; and a thermal insulating member configured to thermally insulate the piezoelectric resonator member from the electrically unpowered detector member.

In addition, in one embodiment, the imaging device includes digital circuitry that is configured to (i) determine the frequency or period of oscillation of the output signal generated by the piezoelectric resonator member as a result of the mechanical force applied to the piezoelectric resonator member by the electrically unpowered detector member, and to (ii) determine an amount of said incident thermal infrared radiation exposure based on the determined frequency or period of oscillation of the output signal generated by the piezoelectric resonator member.

In another embodiment of the invention, an imaging device includes a substrate comprising a spherical surface and an array of thermal infrared detectors formed on the spherical surface of the substrate. The spherical surface may be convex or concave shaped.

Other embodiments of the invention will be described in following detailed description of illustrative embodiments thereof, which is to be read in conjunction with the accompanying drawings.

BRIEF DESCRIPTION OF THE DRAWINGS

FIGS. 3A and 3B schematically illustrate a non-planar detector array which is configured to emulate a spherical array, according to an embodiment of the invention, wherein FIG. 3A is a schematic top plan view of the non-planar detector array, and FIG. 3B is a schematic side view of the non-planar detector array viewed along line 3B-3B in FIG. 3A.

FIGS. 4A and 4B schematically illustrate a non-planar detector array which is configured to emulate a spherical array, according to another embodiment of the invention, wherein FIG. 4A is a schematic top plan view of the non-planar detector array, and FIG. 4B is a schematic cross-sectional view of the non-planar detector array taken along line 4B-4B in FIG. 4A.

FIGS. 18A, 18B, and 18C are schematically views of camera device comprising a spherical imager, according to an embodiment of the invention.

FIG. 19 graphically illustrates an advantage of using a direct-to-digital passive detector framework over conventional analog signal detector or quantum electronic designs, according to exemplary embodiments of the invention.

DETAILED DESCRIPTION OF EXEMPLARY EMBODIMENTS

Embodiments of the invention will now be described in further detail below with regard spherical detector arrays that are implemented using passive detector structures for thermal imaging applications. It is to be understood that the various layers, structures, and regions shown in the accompanying drawings are schematic illustrations that are not drawn to scale. In addition, for ease of explanation, one or more layers, structures, and regions of a type commonly used to form imaging devices or structures may not be explicitly shown in a given drawing. This does not imply that any layers, structures, and regions not explicitly shown are omitted from the actual imaging devices and structures. Furthermore, it is to be understood that the embodiments discussed herein are not limited to the particular materials, features, and/or processing steps as described herein.

Moreover, the same or similar reference numbers are used throughout the drawings to denote the same or similar features, elements, or structures, and thus, a detailed explanation of the same or similar features, elements, or structures will not be repeated for each of the drawings. It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error is present, such as 1% or less than the stated amount.

Figure 1:
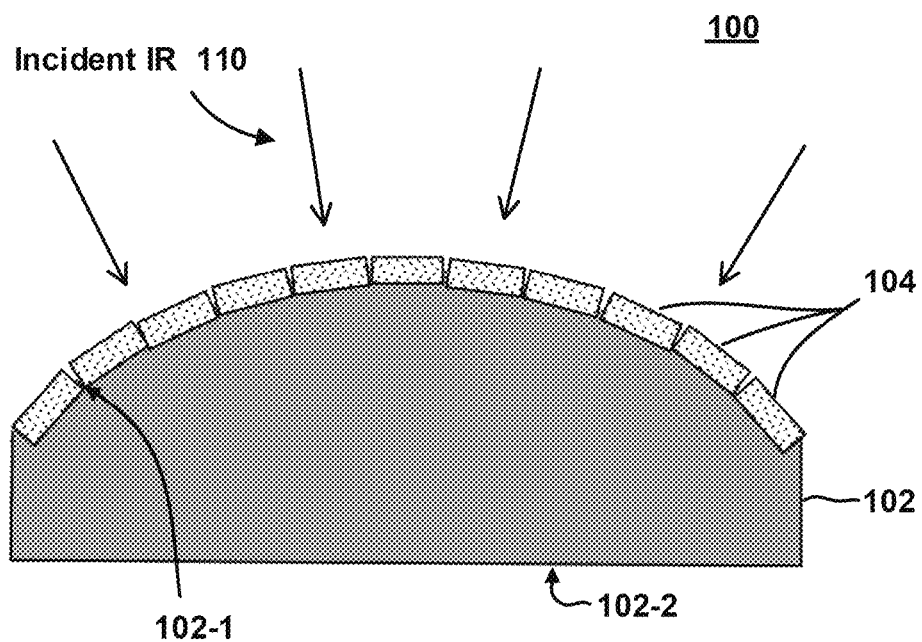
FIG. 1 schematically illustrates a spherical detector array comprising a convex detector array configuration according to an embodiment of the invention.

FIG. 1 schematically illustrates a spherical detector array according to an embodiment of the invention. In particular, FIG. 1 is a cross-sectional schematic view of a spherical detector array 100 comprising a substrate 102 and an array of detector elements 104. The substrate 102 comprises a convex shaped surface 102-1 on which the array of detector elements 104 are formed. In one embodiment of the invention, the detector elements 104 are configured to detect incident radiation 110 in the infrared portion of the electromagnetic spectrum. The detector elements 104 can be implemented using detector structures as discussed in further detail below.

In one embodiment, the substrate 102 comprises a semiconductor substrate that is formed of a semiconductor material such as silicon or other types of semiconductor materials or compound semiconductor materials, which is suitable for the given application. The substrate 102 comprises a planar active surface 102-2 on which integrated circuitry is formed to support imaging/detection functions, such as a read out integrated circuit ("ROIC") and other related circuitry (as discussed below, for example in connection with FIGS. 20 and 21). The convex shaped surface 102-1 of the substrate 102 can be formed on the backside (inactive) surface of the semiconductor substrate 102 using standard semiconductor processing techniques. For example, the convex shaped surface 102-1 can be formed by etching the planar backside surface of the substrate 102 to pattern the convex shaped surface 102-1, or the convex shaped surface 102-1 can be formed by growing or depositing semiconductor material on the planar backside surface of the substrate 102 to obtain the convex shaped surface profile.

The detector elements 104 comprise structures/components that are formed on the convex-shaped surface 102-1. As explained in further detail below, the detector elements 104 are implemented using novel detector architectures which are relatively simple, as compared to conventional IR detectors, for example, and which enable the detector elements 102 to be readily fabricated on curved substrate surfaces (which is not feasible with conventional IR detector architectures). The detector elements 104 are connected to the front-side circuitry on the active surface 102-2 of the substrate 102 using TSVs (through-silicon vias), for example.

Figure 2:
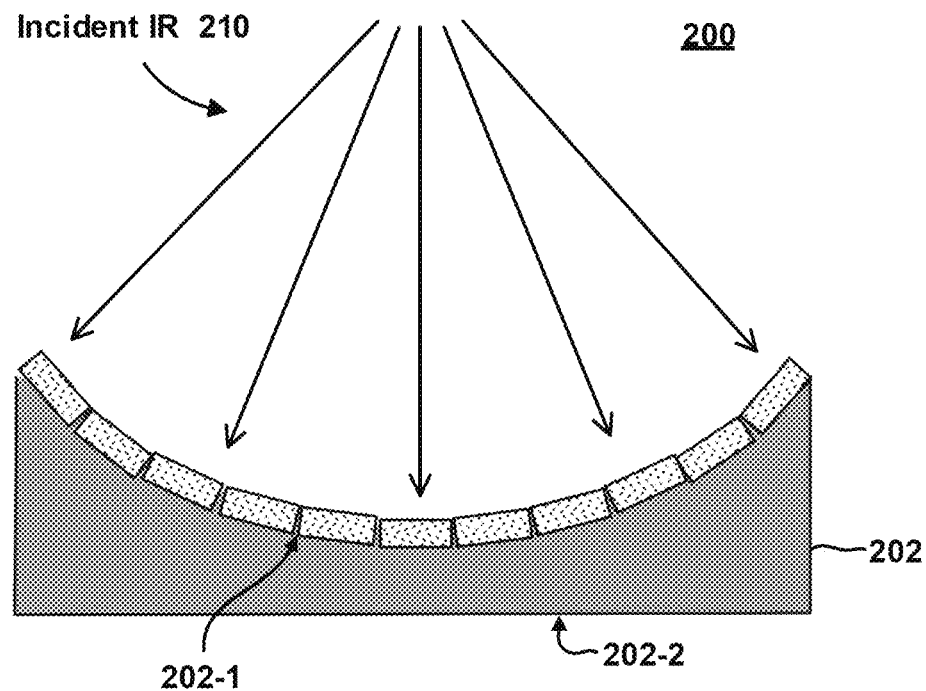
FIG. 2 schematically illustrates a spherical detector array comprising a concave detector array configuration according to an embodiment of the invention.

FIG. 2 schematically illustrates a spherical detector array according to another embodiment of the invention. In particular, FIG. 2 is a cross-sectional schematic view of a spherical detector array 200 comprising a substrate 202 and an array of detector elements 204 which are formed on a concaved shaped surface 202-1 of the substrate 202. In one embodiment of the invention, the detector elements 204 are configured to detect incident radiation 210 in the infrared portion of the electromagnetic spectrum. The detector elements 204 can be implemented using detector structures as discussed in further detail below.

Similar to the embodiment of FIG. 1, the substrate 202 comprises a semiconductor substrate that is formed of a semiconductor material such as silicon or other types of semiconductor materials or compound semiconductor materials, which is suitable for the given application. In addition, the substrate 202 comprises a planar active surface 202-2 on which integrated circuitry is formed to support imaging/detection functions for the array of detectors 204. The convex shaped surface 202-1 of the substrate 202 can be formed on the backside (inactive) surface of the semiconductor substrate 202 using standard semiconductor processing techniques. For example, the concave shaped surface 202-1 can be formed by etching the planar backside surface of the substrate 202. The detector elements 204 comprise structures/components that are formed on the concave shaped surface 202-1. In one embodiment, the detector elements 204 are connected to the front-side circuitry on the active surface 202-2 of the substrate 202 using TSVs, for example.

While FIGS. 1 and 2 show alternate embodiments of spherical detector arrays 100 and 200 with convex and concave shaped profiles, respectively, alternative embodiments of the invention may include other spherical-shaped detector arrays such as toroidal-shape arrays. The spherical profile of a detector array can vary depending on the application and the type of optics that are used for focusing incident radiation at the detector arrays.

For example, as shown in FIG. 1, the convex shaped detector array 104 can be used when the optical system is configured to output incident IR radiation 110 which converges to a focal point. Further, as shown in FIG. 2, the concave shaped detector array 202 can be used when the optical system is configured to output incident IR radiation which diverges from a focal point. In general, spherical detector arrays according to embodiments of the invention can be utilized in conjunction with a catadioptric optical system in which refraction and reflection are combined in a optical system using lenses (dioptrics) and spherical mirrors (or other suitable curved mirrors).

Figure 3A:
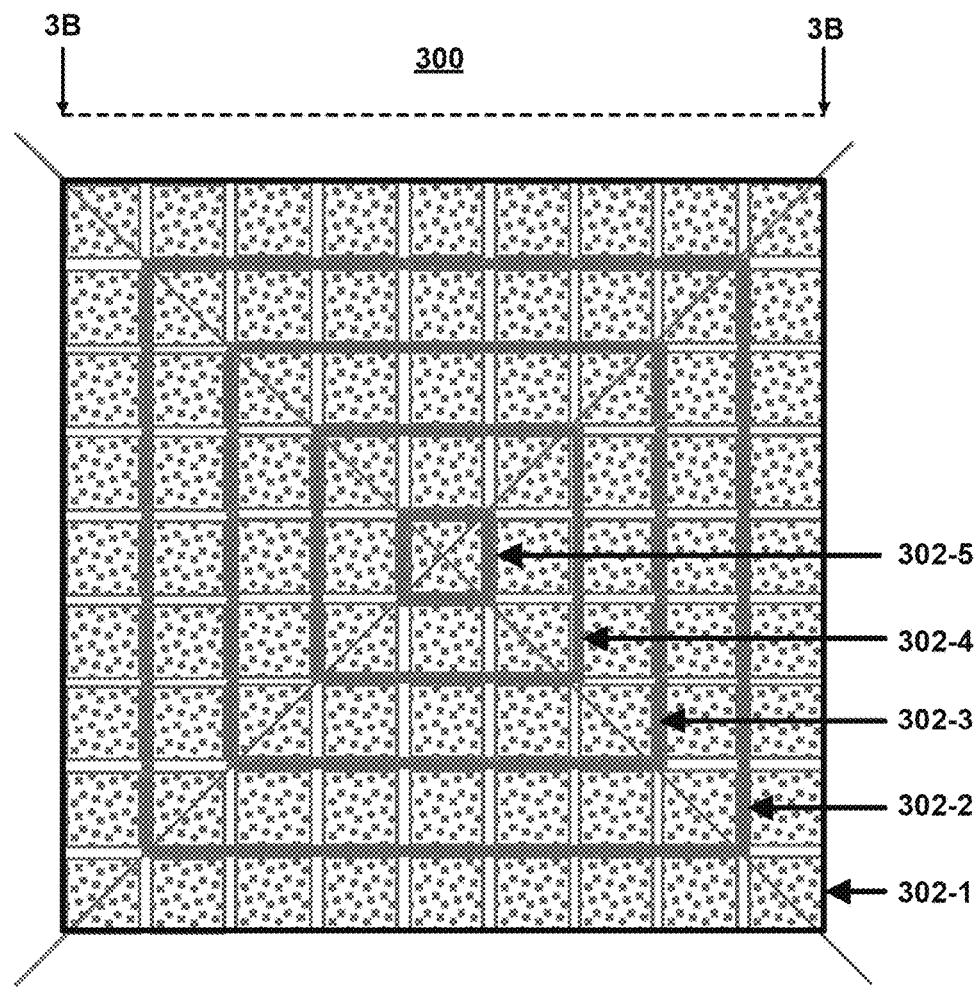
Figure 3B:
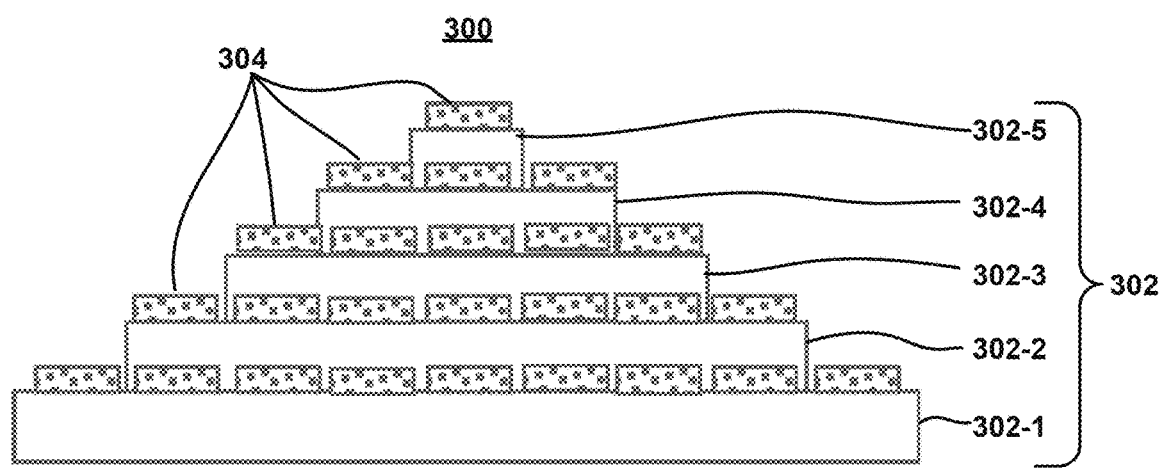

FIGS. 3A and 3B schematically illustrate a non-planar detector array which is configured to emulate a spherical array, according to embodiment of the invention. In particular, FIG. 3A is a schematic top plan view of a non-planar detector array 300, and FIG. 3B is a schematic side view of the non-planar detector array 300 as viewed along line 3B-3B in FIG. 3A. In general, the non-planar detector array 300 comprises a substrate 302 having a step structure with multiple levels of concentric square-shaped steps 302-1, 302-2, 302-3, 302-4 and 302-5 that are disposed at different heights to emulate a convex shaped spherical surface. Each concentric square-shaped step 302-1, 302-2, 302-3, 302-4 and 302-5 comprises a plurality detector elements 304 which are configured to detect IR radiation using detector architectures as discussed below.

The non-planar detector array 300 of FIGS. 3A and 3B provides a high-fill factor design wherein the detectors 304 can be of equal size and closely spaced. Any distortion that is present in a captured IR image due to the concentric square-shaped geometric design of the non-planar array 300 can be corrected in software using known image correction techniques.

Figure 4A:
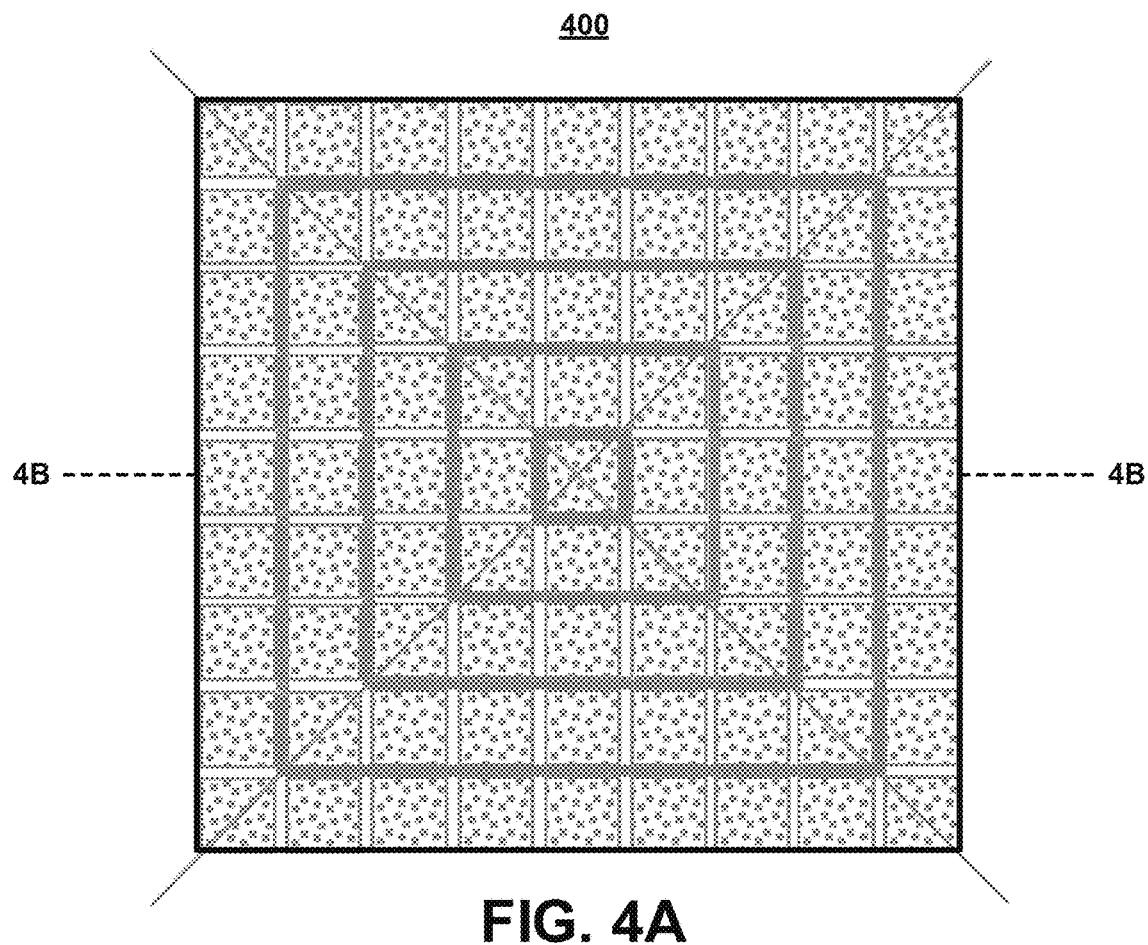
Figure 4B:
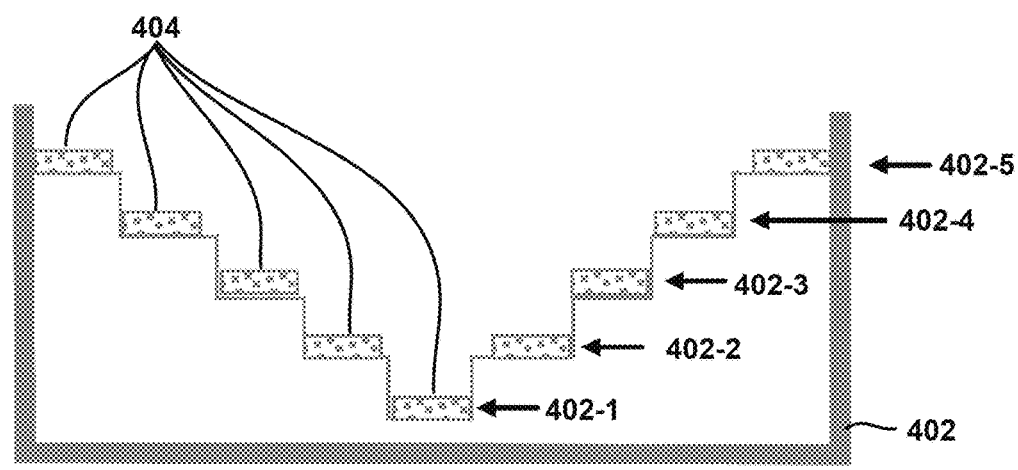

FIGS. 4A and 4B schematically illustrate a non-planar detector array which is configured to emulate a spherical array, according to another embodiment of the invention, wherein FIG. 4A is a schematic top plan view of the non-planar detector array, and FIG. 4B is a schematic cross-sectional view of the non-planar detector array taken along line 4B-4B in FIG. 4A. In general, the non-planar detector array 400 comprises a substrate 402 having a step structure with multiple levels of concentric square-shaped steps 402-1, 402-2, 402-3, 402-4 and 402-5 that are disposed at different heights to emulate a concave shaped spherical surface. Each concentric square-shaped step 402-1, 402-2, 402-3, 402-4 and 402-5 comprises a plurality detector elements 404 which are configured to detect IR radiation using detector architectures as discussed below.

The non-planar detector array 400 of FIGS. 4A and 4B provides a high-fill factor design wherein the detectors 404 can be of equal size and closely spaced. Any distortion that is present in a captured IR image due to the concentric square-shaped geometric design of the non-planar array 400 can be corrected in software using known image correction techniques.

Figure 5:
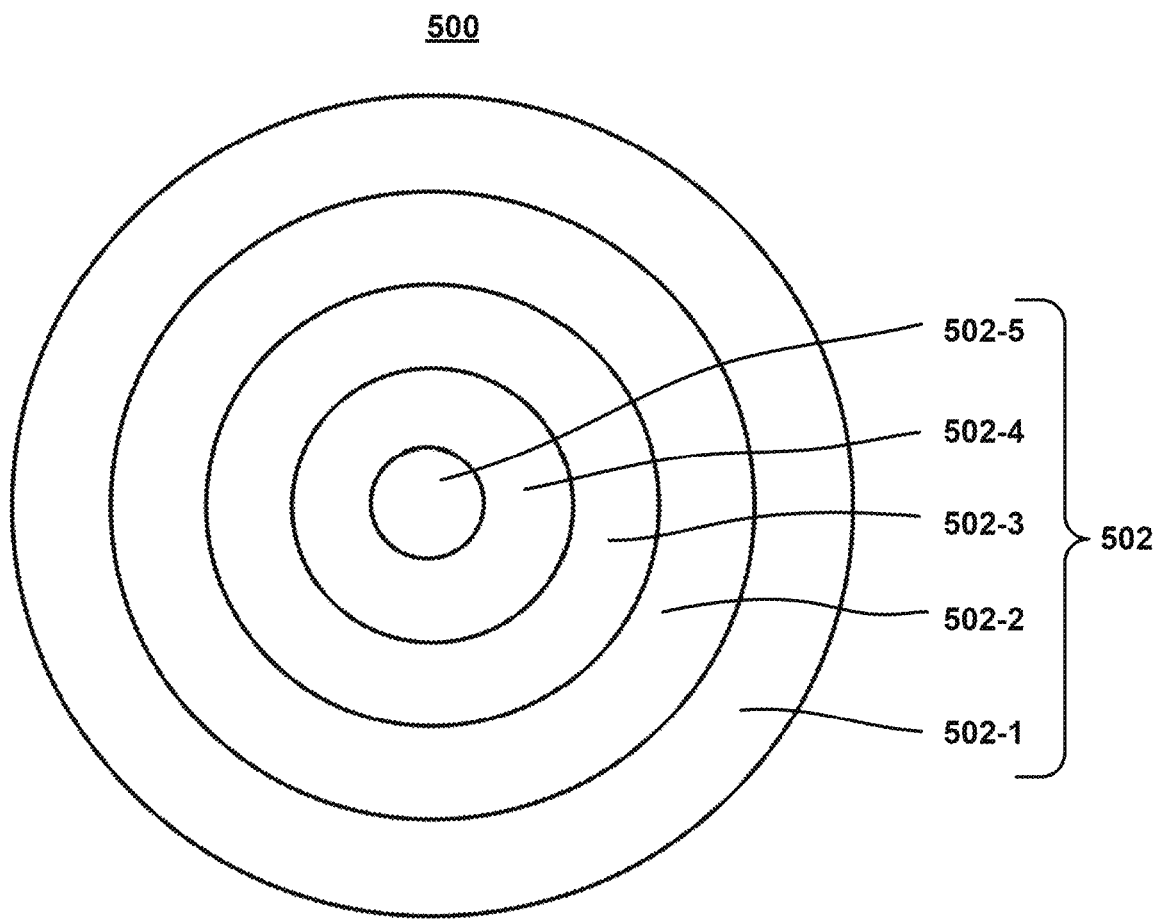
FIG. 5 schematically illustrates a non-planar detector array which is configured to emulate a spherical array, according to another embodiment of the invention.

FIG. 5 schematically illustrates a non-planar detector array which is configured to emulate a spherical array, according to another embodiment of the invention. In particular, FIG. 5 is a schematic top plan view of a non-planar detector array 500 which comprises a substrate 502 having a step structure with multiple levels of concentric circle-shaped steps 502-1, 502-2, 502-3, 502-4 and 502-5 that are disposed at different heights to emulate a convex shaped spherical surface (as in FIGS. 3A and 3B) or a concave shaped spherical surface (as in FIGS. 4A and 4B). Each concentric circle-shaped step 502-1, 502-2, 502-3, 502-4 and 502-5 comprises a plurality detector elements (not specifically shown) formed thereon, which are configured to detect IR radiation using detector architectures as discussed below.

The fill-factor that is achieved for the non-planar detector array 500 of FIG. 5 will vary depending on the footprint size and shape of the detector elements. In instances where the detector elements are fabricated with varying footprint sizes and/or shapes to increase the fill factor of the concentric circular step level substrate design, which results in different sensitivities of the detector elements, such disparity in sensitivity can be determined a priori and corrected using software when generating IR images.

The spherical and non-planar detector arrays discussed herein can be implemented using thermal infrared detector structures according to various embodiment of the invention as will be discussed in further detail below. In general, thermal IR detectors according to embodiments of the invention comprise unpowered, passive front-end detector structures with direct-to-digital measurement data output for detecting incident IR radiation. Exemplary passive detector frameworks described herein provide a new paradigm for detecting incident IR energy with passive detector frameworks that implement a direct-to-digital measurement with no analog front end or quantum semiconductors, thereby providing a low noise, low power, low cost and ease of manufacture detector design, as compared to conventional CMOS or CCD detector devices. Passive detector frameworks with direct-to-digital measurement data output as described herein do not use quantum photonic or electron conversion techniques, and have none of the technological, manufacturing or noise problems associated with conventional imager technologies.

In general, a thermal infrared detector according to an embodiment of the invention comprise structures and components that are formed on a substrate. For example, a thermal infrared detector comprises a piezoelectric resonator member (e.g., PZT) formed of a piezoelectric material that is configured to molecularly resonate in response to a drive voltage and generate an output signal having a frequency or period of oscillation. The thermal IR detector further comprises an electrically unpowered detector member (IR-Absorber), wherein the electrically unpowered detector member is configured for exposure to incident thermal infrared radiation. The electrically unpowered detector member comprises a material having a thermal coefficient of expansion (CTE) which causes the electrically unpowered detector member to distort due to absorption of incident thermal infrared radiation. The electrically unpowered detector member applies a mechanical force to the piezoelectric resonator member due to the distortion of the electrically unpowered detector member, and cause a change in a frequency or period of oscillation of the output signal generated by the piezoelectric resonator member due to said mechanical force applied to the piezoelectric resonator member. The thermal infrared detector further includes a thermal insulating member configured to thermally insulate the piezoelectric resonator member from the electrically unpowered detector member.

For thermal imaging, digital circuitry is provided, which is configured to (i) determine the frequency or period of oscillation of the output signal generated by the piezoelectric resonator member as a result of the mechanical force applied to the piezoelectric resonator member by the electrically unpowered detector member, and to (ii) determine an amount of said incident thermal infrared radiation exposure based on the determined frequency or period of oscillation of the output signal generated by the piezoelectric resonator member. The digital circuitry provides a "direct-to-digital" imaging scheme that simplifies the system and delivers digital data directly to a ROIC (read out integrated circuitry). The IR detector does not utilize analog components and, therefore, eliminates most noise sources and increases sensitivity. The IR detector can be designed to detect the 4 μm & 10 μm thermal IR spectrum in real-time on the same optical centerline.

Figure 6B:
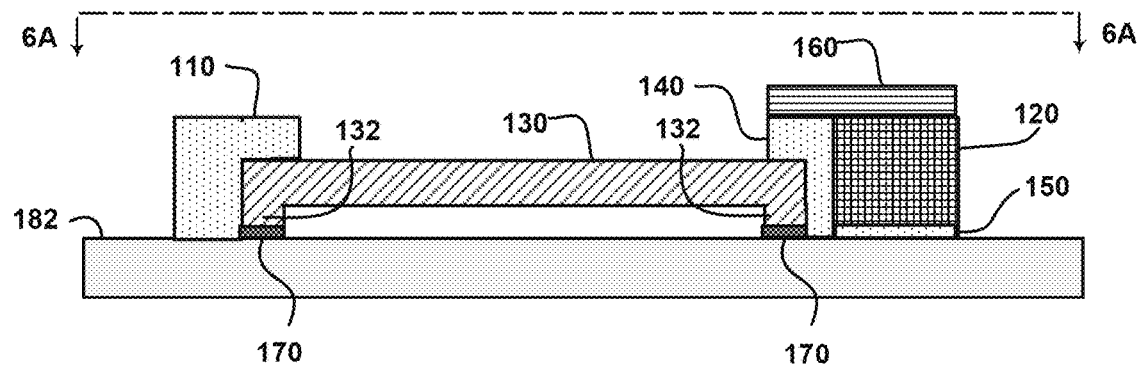
FIGS. 6A and 6B are perspective views of a photon detector according to an embodiment of the invention, which is based on a coefficient of thermal expansion (CTE) framework.
Figure 6A:
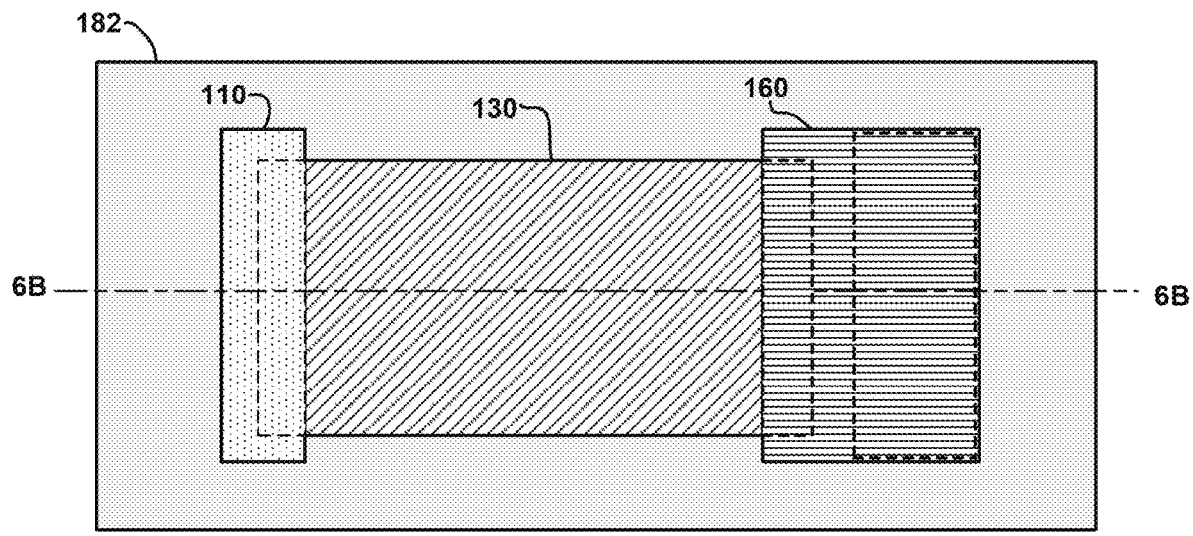

FIGS. 6A and 6B are schematic views of a photon detector 180 according to an embodiment of the invention, which is based on a CTE framework. FIG. 6A is a top view of the photon detector 180 and FIG. 6B is a cross-sectional view of the photon detector 180 taken along line 6B-6B in FIG. 6A. In general, as shown in FIGS. 6A and 6B, the photon detector 180 comprises a substrate 182, a support member 110, a resonator member 120, and an electrically unpowered detector member 130 disposed between the support member 110 and the resonator member 120. A thermal insulating member 140 is disposed between the detector member 130 and the resonator member 120. A thermal insulating layer 150 is disposed between the resonator member 120 and the substrate 182. A protective cap layer 160 is formed on top of the resonator member 120.

In one embodiment, the resonator member 120 is formed of a piezoelectric material that is configured to molecularly resonate in response to a drive voltage and generate an output signal having a frequency or period of oscillation. The unpowered detector member 130 is configured for exposure to incident thermal infrared radiation, wherein the unpowered detector member 130 comprises a material (e.g., copper) having a thermal coefficient of expansion that causes the unpowered detector member 130 to distort due to absorption of the incident thermal infrared radiation. The unpowered detector member 130 is configured to apply a mechanical force to the piezoelectric resonator member 120 due to the distortion of the unpowered detector member 130, and cause a change in the frequency or period of oscillation of the output signal generated by the piezoelectric resonator member 120 due to the mechanical force applied to the piezoelectric resonator member 120.

To prevent or mitigate the effects on the change in frequency of the output signal generated by the piezoelectric resonator member 120 that can occur due to heating of the material of the piezoelectric resonator member 120, the thermal insulating member 140 is formed of a material that is configured to thermally and electrically insulate the piezoelectric resonator member 120 from the unpowered detector member 130 when the detector member 130 is heated during operation due to absorption of photons (e.g., thermal IR absorption). In addition, the thermal insulating layer 150 is configured to thermally and electrically insulate the piezoelectric resonator member 120 from heat that is generated by active circuitry formed in the active surface of the substrate 182.

Moreover, the protective cap layer 160 formed on top of the resonator member 120 serves to prevent the resonator member 120 from absorbing incident photons and, thus, prevents the heating of the resonator member 120 from photon exposure. The protective cap layer 160 may be formed of any suitable material, such as aluminum, which reflects photonic energy away from the resonator member 120. In addition, the protective cap layer 160 serves as a heat sink (or heat plate) which is configured to absorb thermal energy from the resonator member 120 and maintain the temperature of the resonator member 120 relatively constant for optimal and reliable operation. In one embodiment, the protective cap layer 160 is formed of a metallic material such as aluminum.

As further shown in FIGS. 6A and 6B, the end portions of the detector member 130 comprise supporting leg elements 132, which serve to maintain the detector member 130 at some offset height from the surface of the substrate 182. This allows the detector member 130 to be thermally insulated from the substrate 182. Furthermore, a thermal insulating layer 170 is disposed between the leg elements 132 of the detector member 130 and the substrate 182. The thermal insulating layer 170 also serves to thermally insulate the detector member 130 from the substrate 182 (e.g., prevent transfer of thermal energy between the leg elements 132 and the substrate 182). In addition, the thermal insulating layer 170 is formed of a material that mitigates or prevents a bonding between the detector member 130 and the substrate 182, and enables the leg elements 132 and to freely slide on the surface of the thermal insulating layer 170 as the detector member 130 expands and contracts during operation. In one embodiment of the invention, the thermal insulating layer 170 is formed of graphite or other similar materials that do not form strong bonds with the material of the detector member 130 at the interfaces between the leg elements 132 and the thermal insulating layer 170.

Furthermore, the substrate 182 comprises digital circuitry formed in an active surface thereof, which is configured to (i) determine the frequency or period of oscillation of the output signal generated by the piezoelectric resonator member 120 as a result of the mechanical force applied to the piezoelectric resonator member 120 by the detector member 130, and to (ii) determine an amount of the incident thermal infrared radiation exposure based on the determined frequency or period of oscillation of the output signal generated by the piezoelectric resonator member 120. Details of the active circuitry according to an embodiment of the invention are described below with reference to FIGS. 22 and 23, for example.

Figure 7A:
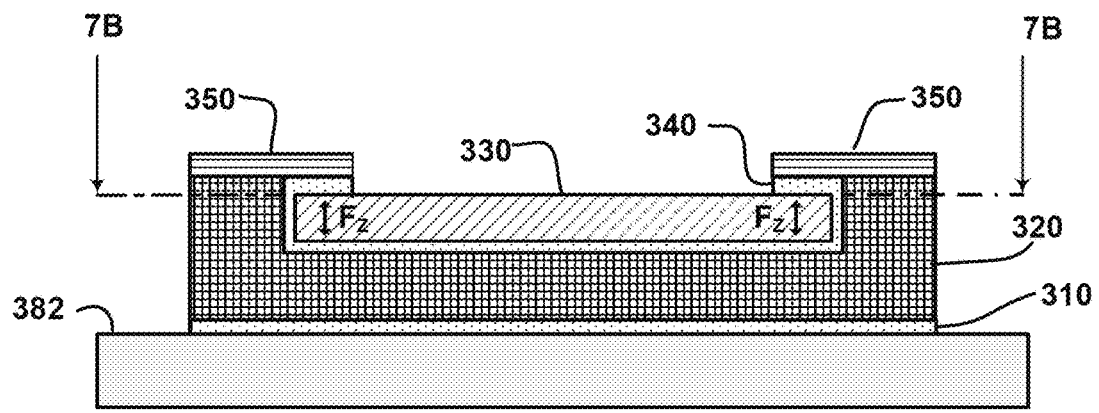
FIGS. 7A and 7B are perspective views of a photon detector according to another embodiment of the invention, which is based on a CTE framework.
Figure 7B:
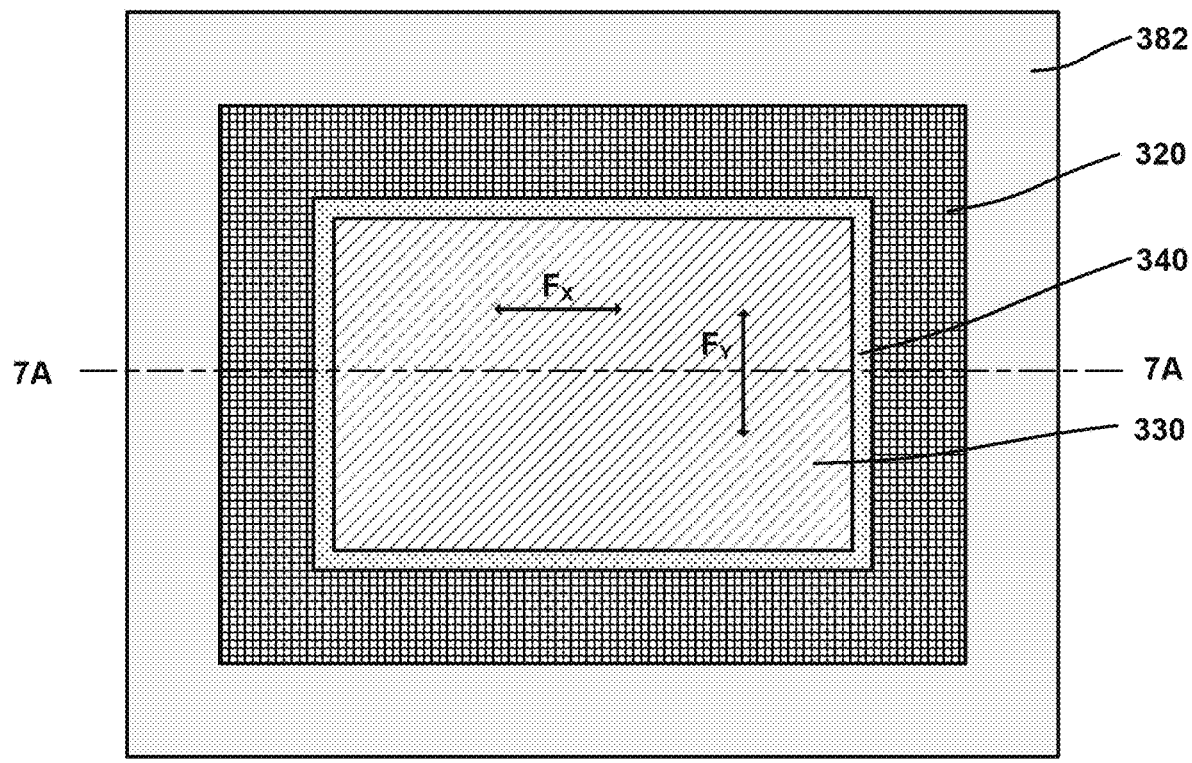

FIGS. 7A and 7B are perspective views of a photon detector 380 according to another embodiment of the invention, which is based on a CTE framework. FIG. 7A is a cross-sectional view of the photon detector 380 taken along line 7A-7A in FIG. 7B, and FIG. 7B is a plan view of the photon detector 380 viewed along line 7B-7B in FIG. 7A. In general, as shown in FIGS. 7A and 7B, the photon detector 380 comprises a substrate 382, a thermal insulating layer 310, a resonator member 320, a detector member 330, a thermal insulating layer 340, and a protective cap layer 350. In one embodiment, the resonator member 320 is a rectangular-shaped resonator member having a cavity region formed in one surface thereof. The detector member 330 is disposed within the cavity region of the resonator member 320, wherein the thermal insulating layer 340 thermally and electrically insulates the resonator member 320 from the detector member 330.

The detector member 330 is secured in place in the cavity region by an overlapping portion of the protective cap layer 350. In particular, in one embodiment of the invention, the protective cap layer 350 is a continuous rectangular frame structure that is formed on the top surface of the resonator member 320, wherein a portion of the protective cap layer 350 overlaps the inner sidewalls of the cavity region to provide a lip that covers the upper peripheral surface edge of the detector member 330, while leaving a large surface area for the detector member 330 to absorb incident photonic energy (e.g., thermal IR energy). Similar to the embodiments discussed above, the protective cap layer 350 serves to reflect incident photonic energy away from the resonator member 320 to prevent heating of the resonator member 320 by photon exposure, and may further serve as a heat sink to absorb thermal energy from the resonator member 320.

The detector member 330 is formed of one or more materials that are sensitive to IR energy, and having a thermal coefficient of expansion which causes the detector member 330 to expand and contract by absorption of incident infrared energy to exert forces on the resonator member 320 in three dimensions Fx, Fy and Fz, as shown in FIGS. 7A and 7B.

To prevent or mitigate the effects on the change in frequency of the output signal generated by the piezoelectric resonator member 320 that can occur due to heating of the material of the piezoelectric resonator member 320, the thermal insulating layers 310 and 340 are formed of one or more materials that are configured to thermally insulate the piezoelectric resonator member 320 from the detector member 330 when the detector member 130 is heated during operation due to absorption of photons (e.g., thermal IR absorption), and from the substrate 382 due to heat that is generated by active circuitry formed in the active surface of the substrate 382.

Furthermore, the substrate 382 comprises digital circuitry formed in an active surface thereof, which is configured to (i) determine the frequency or period of oscillation of the output signal generated by the piezoelectric resonator member 320 as a result of the mechanical force applied to the piezoelectric resonator member 320 by the detector member 330, and to (ii) determine an amount of the incident thermal infrared radiation exposure based on the determined frequency or period of oscillation of the output signal generated by the piezoelectric resonator member 320. Again, details of the active circuitry according to an embodiment of the invention will be described in further detail below.

Figure 8:
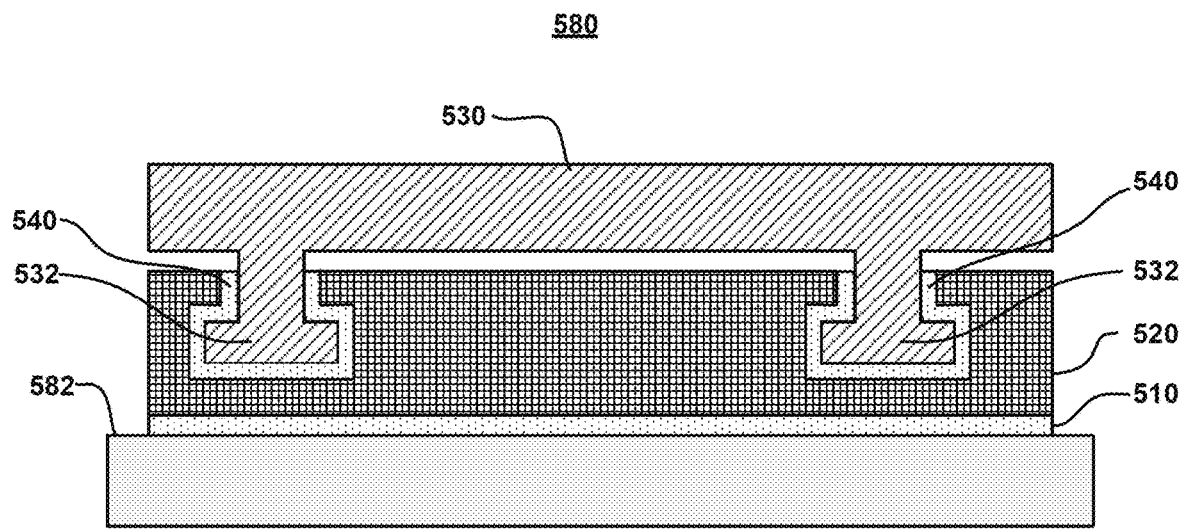
FIG. 8 is a side schematic view of a photon detector according to another embodiment of the invention, which is based on a CTE framework.

FIG. 8 is a side schematic view of a photon detector 580 according to another embodiment of the invention, which is based on a CTE framework. In general, as shown in FIG. 8, the photon detector 580 comprises a substrate 582, a thermal insulating layer 510, a resonator member 520, a detector member 530, and thermal insulating layers 540. The resonator member 520 is a rectangular-shaped resonator member having a T-shaped cavity region formed in one surface thereof. The detector member 530 is sized and shaped to cover the resonator member 520, and comprises a plurality of T-shaped legs 532 that are disposed within the T-shaped recesses of the resonator member 520. The T-shaped design serves to maintain the detector member 530 in place and not disconnect from the resonator member 520. The thermal insulating layer 540 serves to thermally and electrically insulate the resonator member 520 from the detector member 530, and the thermal insulating layer 510 serves to insulate the resonator member 520 from the substrate 582.

In one embodiment of the invention, the photon detector 580 is designed to be stress-neutral at room temperature, i.e., the photon detector 580 is fabricated so that at room temperature (e.g., 70° F.=300K), the resonator member 520 is in a non-stressed state with no compressive or tensile stress applied to the resonator member 520 by the detector member 530. In this state, the photon detector 500 can be configured to operate within a range of ambient temperatures starting from room temperature and up to an "uncooled" temperature limit of operation. In this mode of operation, the resonator member 520 generates and outputs a signal having a non-stressed quiescent frequency ($F_{non-stress}$) in the non-stressed state. However, in response to photon exposure, the detector member 530 will be heated and expand to apply a tensile (stretching) force on the resonator member 520. The tensile force on the resonator member 520 causes a decrease in the quiescent frequency of the signal generated by the resonator member 520, wherein a tensile-stress quiescent frequency ($F_{tensile-stress}$) is less than the non-stressed quiescent frequency ($F_{non-stress}$).

In another mode of operation, the photon detector 580 can be configured to operate at below room temperature by cooling the substrate 582 through thermoelectric cooling, for example. The cooling of the substrate 582 would result in cooling of the detector member 530, causing the detector member 530 to contract, which in turn, would cause a compressive stress to be applied to the resonator member 520. In response to a compressive force, the resonator member 520 would generate and output a signal having a compressive-stress quiescent frequency ($C_{ompressive-stress}$) which is greater than the non-stressed quiescent frequency ($F_{non-stress}$). During operation, in response to photon exposure, the detector member 530 will be heated and expand, which would cause a reduction in the compressive force and depending on the amount of photon exposure, the detector member 530 may expand to an extent that the resonator member 520 goes from a compression-stress state, to a non-stressed state, and to a tensile-stress state.

In this regard, the cooling would effectively would increase the starting or quiescent frequency of the resonator ($C_{ompressive-stress}$) thereby allowing the photon detector 520 to have a larger temperature sensing range, i.e., starting from the lower temperature and higher compressive-stress quiescent frequency ($C_{ompressive-stress}$), passing room temperature and the non-stressed quiescent frequency ($F_{non-stress}$), into high ambient temperatures and lower tensile-stress quiescent frequencies ($F_{tensile-stress}$), until reaching the upper "uncooled" operational limit of the photon detector 500, thus extending the measurable range of the photon detector 500 on the fly.

Figure 9:
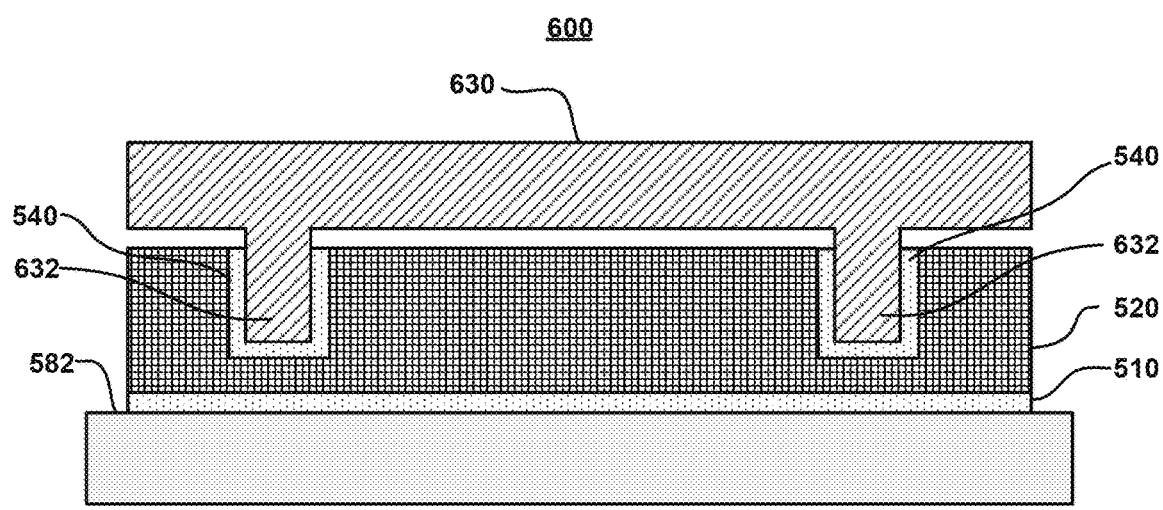
FIG. 9 is a side schematic view of a photon detector according to another embodiment of the invention, which is based on a CTE framework.

FIG. 9 is a side schematic view of a photon detector 600 according to another embodiment of the invention, which is based on a CTE framework. The photon detector 600 of FIG. 9 is similar to the photon detector 500 of FIG. 8, expect that a detector member 630 in FIG. 9 comprises elongated-shaped legs 632 that are disposed in recesses formed in a surface of the resonator member 520. This design is possible when the bonding interface between the materials forming the insulating layer 540 and the legs 632 of the detector member 630 is strong enough to hold the detector member 630 in place.

Figure 10A:
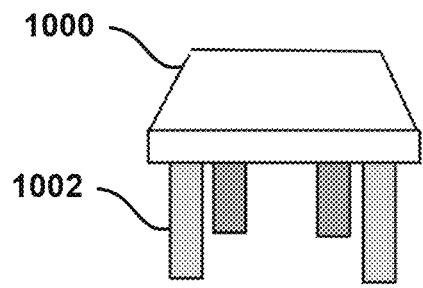
FIGS. 10A, 10B, and 10C schematically illustrate different structures for implementing the detector members of FIGS. 8 and 9, according to alternate embodiments of the invention.
Figure 10B:
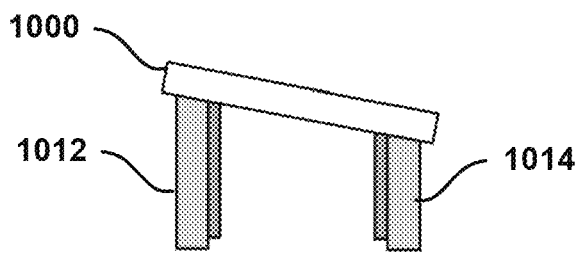
Figure 10C:
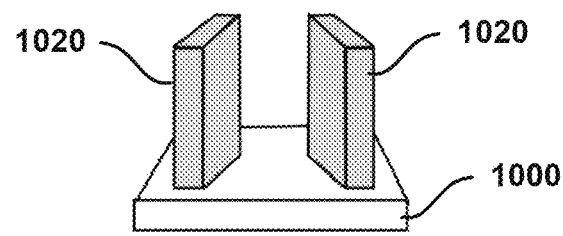

FIGS. 10A, 10B, and 10C schematically illustrate different structures for implementing the detector members 530 and 630 of FIGS. 8 and 9. FIG. 10A shows a detector member 1000 comprising four separate elongated legs 1002, which are disposed in four separate recesses formed in a surface of a resonator member. The elongated legs 1002 are of equal length. FIG. 10B shows an embodiment wherein the elongate legs 1012 and 1014 are of different lengths so that the detector member 1000 can be disposed at some angle. This framework allows the detector member 1000 to be disposed at some angle that is orthogonal to, or close to being orthogonal to, incident photonic radiation in instances wherein the detector elements are formed on flats surface (e.g., formed on the concentric step levels of the substrate structures 302 and 402 shown in FIGS. 3A/3B and 4A/4B. FIG. 10C schematically illustrates an embodiment of a detector member 1000 having two legs 1020, as opposed to four legs as in the embodiments of FIGS. 10A and 10B.

Figure 11:
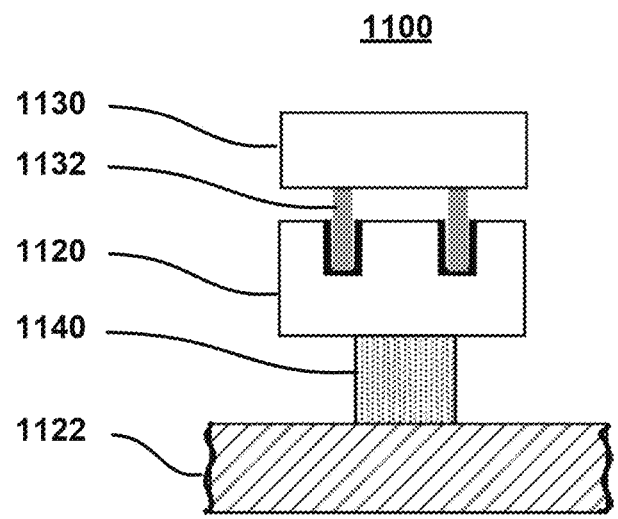
FIG. 11 schematically illustrates a photon detector according to another embodiment of the invention.

FIG. 11 schematically illustrates a photon detector 1100 according to another embodiment of the invention. The photon detector 1100 is similar to the embodiments of FIGS. 8 and 9 in that the photon detector 1100 comprises a resonator member 1120, a detector member 1130 which comprises elongated legs 1132 that are disposed in recesses formed in a surface of the resonator member 1120. In the embodiment of FIG. 11, an insulating pedestal structure 1140 is implemented to maintain the resonator member 1120 at some height above the substrate 1122. The insulating pedestal structures 1140 can be formed with variable heights for different photon detectors in a given detector array to obtain desired structural configurations (e.g., as in FIG. 13 discussed below)

Figure 12:
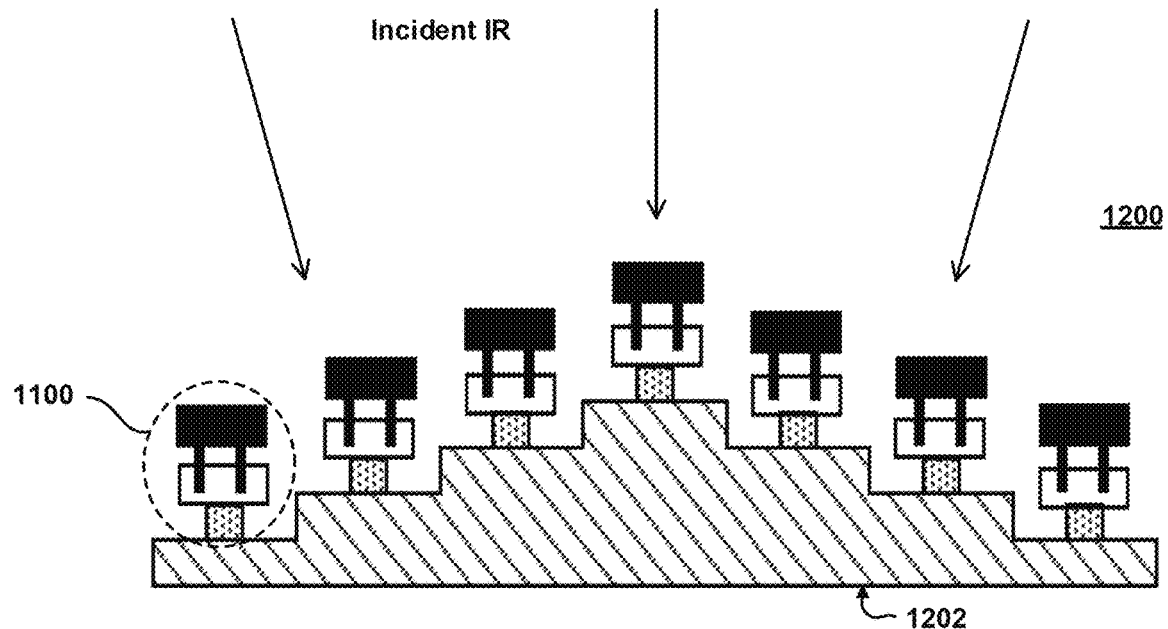
FIG. 12 is a cross-sectional view of a non-planar detector array which is configured to emulate a spherical array, according to another embodiment of the invention.

FIG. 12 is a cross-sectional view of a non-planar detector array which is configured to emulate a spherical array, according to another embodiment of the invention. More specifically, FIG. 12 schematically illustrates a non-planar detector array 1200 comprising a substrate 1202 in the form of a step structure with multiple levels of concentric square-shaped or circular-shaped steps that are disposed at different heights to emulate a convex spherical surface. FIG. 12 is an example embodiment of the framework of FIGS. 3A/3B or 5, which is implemented using an array of photon detectors 1100 as shown in FIG. 11. The photon detectors 1100 can be implemented using the detector member 1000 of FIG. 10B with varying leg lengths so that the detector member 1000 can be angularly positioned orthogonally to incident IR radiation.

Figure 13:
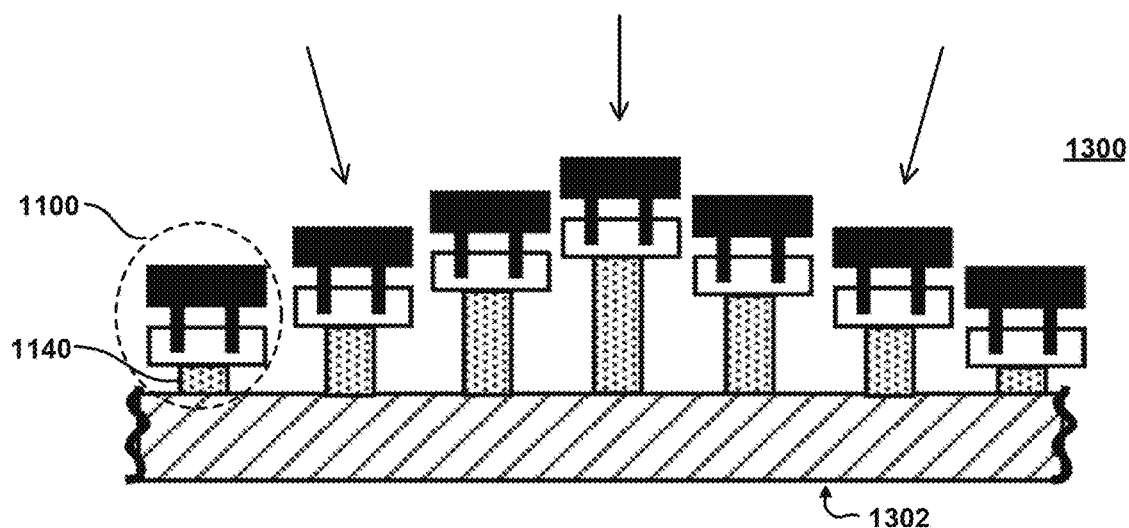
FIG. 13 is a cross-sectional view of a non-planar detector array which is configured to emulate a spherical array, according to another embodiment of the invention.

FIG. 13 is a cross-sectional view of a non-planar detector array which is configured to emulate a spherical array, according to another embodiment of the invention. More specifically, FIG. 13 schematically illustrates a non-planar detector array 1300 comprising a planar substrate 1302, wherein an array of photon detectors 1100 are utilized with pedestal structures 1140 of varying heights to emulate a convex spherical surface. The photon detectors 1100 can be implemented using the detector member 1000 of FIG. 10B with varying leg length so that the detector members 1000 can be angularly positioned orthogonally to incident IR radiation.

Figure 14:
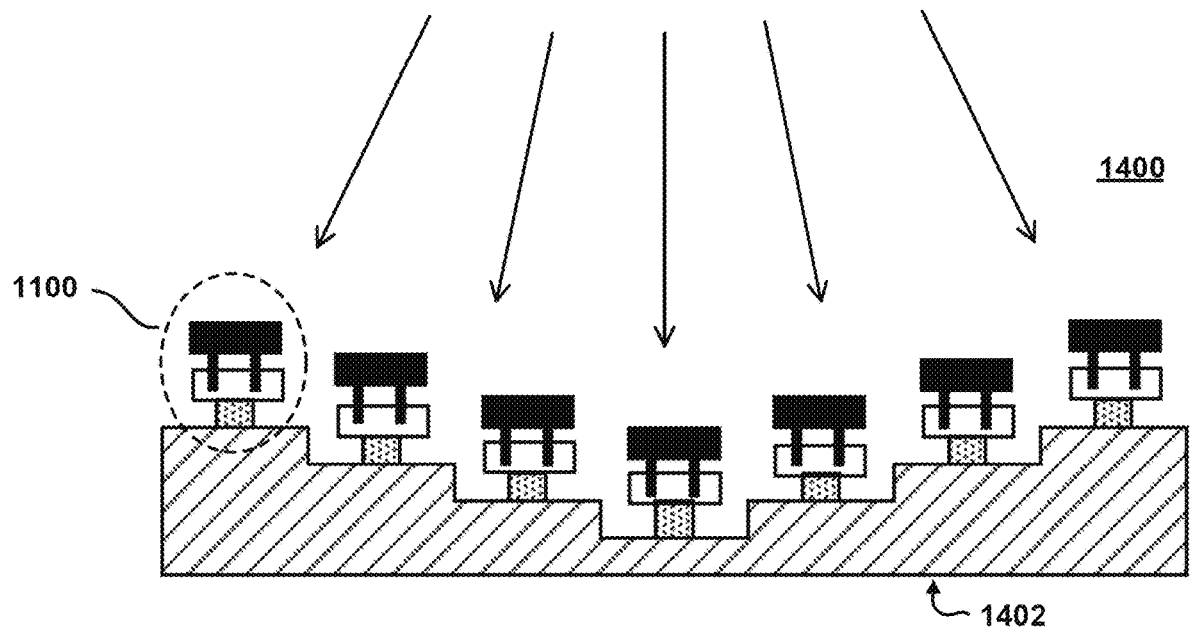
FIG. 14 is a cross-sectional view of a non-planar detector array which is configured to emulate a spherical array, according to another embodiment of the invention.

FIG. 14 is a cross-sectional view of a non-planar detector array which is configured to emulate a spherical array, according to another embodiment of the invention. More specifically, FIG. 14 schematically illustrates a non-planar detector array 1400 comprising a substrate 1402 in the form of a step structure with multiple levels of concentric square-shaped or circular-shaped steps that are disposed at different heights to emulate a concave shaped spherical surface. FIG. 14 is an example embodiment of the framework of FIGS. 4A/4B or 5, which is implemented using an array of photon detectors 1100 as shown in FIG. 11. The photon detectors 1100 can be implemented using the detector member 1000 of FIG. 10B with varying leg lengths so that the detector members 1000 can be angularly positioned orthogonally to incident IR radiation.

Figure 15:
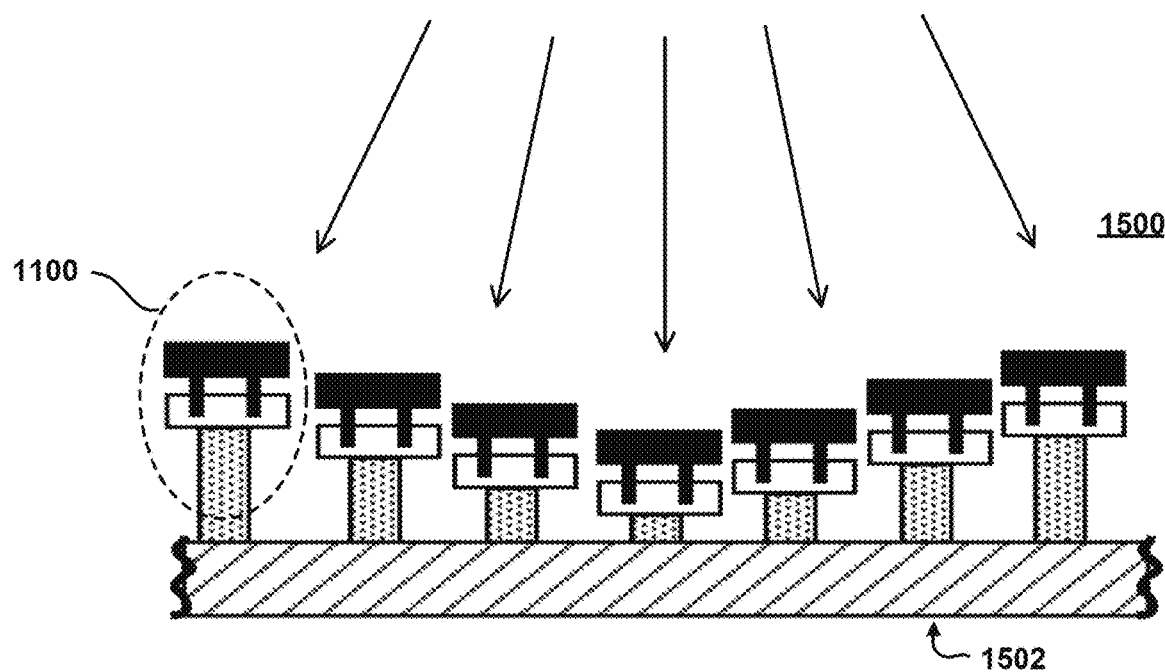
FIG. 15 is a cross-sectional view of a non-planar detector array which is configured to emulate a spherical array, according to another embodiment of the invention.

FIG. 15 is a cross-sectional view of a non-planar detector array which is configured to emulate a spherical array, according to another embodiment of the invention. More specifically, FIG. 15 schematically illustrates a non-planar detector array 1500 comprising a planar substrate 1502, wherein an array of photon detectors 1100 are utilized with pedestal structures 1140 of varying heights to emulate a concave shaped spherical array. The photon detectors 1100 can be implemented using the detector member 1000 of FIG. 10B with varying leg lengths so that the detector members 1000 can be angularly positioned orthogonally to incident IR radiation.

Figure 16:
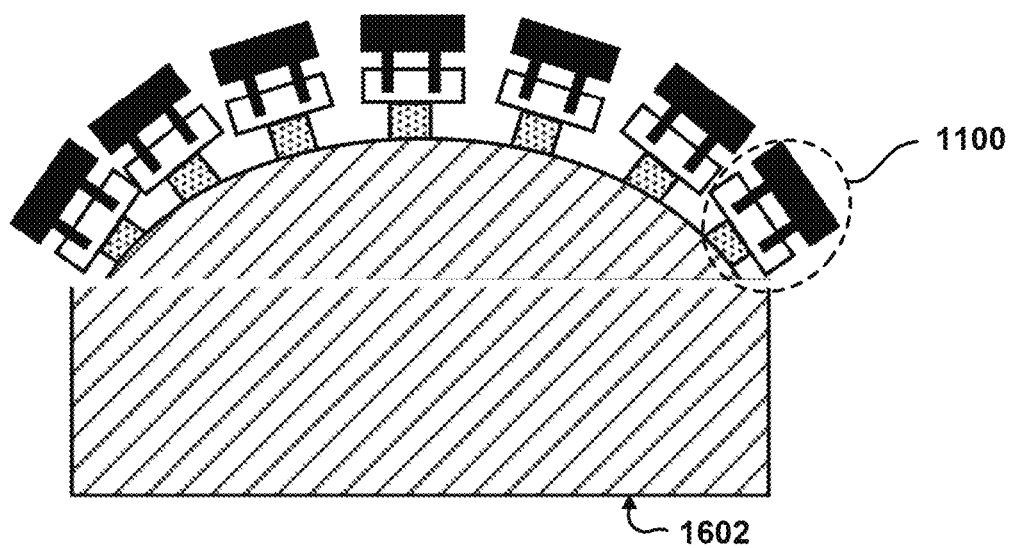
FIG. 16 is a cross-sectional view of a spherical detector array, according to another embodiment of the invention.
Figure 17:
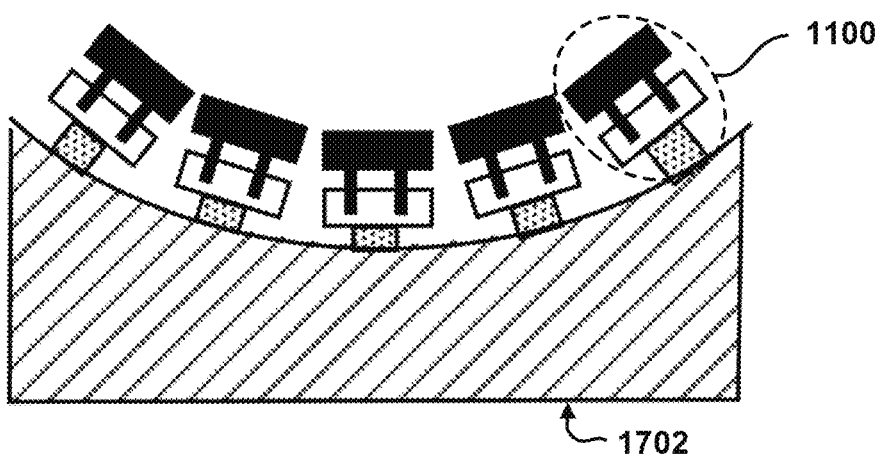
FIG. 17 is a cross-sectional view of a spherical detector array according to another embodiment of the invention.

FIG. 16 is a cross-sectional view of a spherical detector array, according to another embodiment of the invention. More specifically, FIG. 16 is an example embodiment (of the conceptual framework of FIG. 1) implementing a spherical array of the photon detectors 1100 of FIG. 11 on a convex shaped substrate 1602. Similarly, FIG. 17 is an example embodiment of a spherical detector array (based on conceptual framework of FIG. 2) implementing a spherical array of the photon detectors 1100 of FIG. 11 on a concave shaped substrate 1702.

FIGS. 18A, 18B, and 18C are schematically views of an imaging device comprising a spherical imager, according to an embodiment of the invention. In particular, FIG. 18A is a side schematic view of an imaging device 1800 comprising a housing 1802, an input aperture 1804, an imager support structure 1806, a spherical mirror 1808, a spherical detector array device 1810, and an optional visible light (or other spectral segment imager such as Near IR or UV) camera 1812. The support structure 1806 is made from a material that is essentially transparent to IR radiation, so that IR radiation that enters the apertures 1804 can pass through the support structure 1806 towards the spherical mirror 1808. The spherical mirror 1808 focuses the incoming IR radiation towards the spherical detector array device 1810. The spherical detector array device 1810 comprises a spherical array of IR detectors, which is constructed using various techniques and structures as discussed herein to detect 1R radiation. The spherical IR imager 1810 can be designed to detect IR radiation in the 4 um and 10 um IR spectrums. In addition, the optional visible or near-IR imager device 1812 can be disposed behind the spherical imager 1810 in a forward looking direction to detect visible/near IR radiation that is aligned to the optical centerline of the camera lens.

As shown in FIGS. 18B and 18C, the support structure 1806 (support ring) comprises a plurality of electrical traces 1814 that provide connections between the imagers 1810 and 1812 and external electronics and power supply. The support structure 1806 is formed of a material (e.g., Cleartran or sapphire) which is invisible (transparent) to radiation in the mid/far IR spectrums. In addition, the conductive traces 1814, which are formed on the surface of the support structure 1806 to provide power and I/O wiring to the imagers 1810 and 1812, are preferably made of material, such as ITO, which is transparent to radiation in the mid/far IR spectrum.

In all exemplary embodiments discussed above, the detector framework is passive, i.e., the detector elements are not part of the active electrical circuit. When a device uses active powered circuitry it is susceptible to electrical noise. This concept will be illustrated with reference to FIG. 19. FIG. 19 is a graphical illustration (20) showing an advantage of using a direct-to-digital passive detector frameworks over conventional analog signal detector or quantum electronic designs, according to exemplary embodiments of the invention. FIG. 19 illustrates electrical noise (26) that can mask or interfere with an analog signal (22) containing desired sensor data, which is lost in noise (24). In order for the signal data to be detected, it must be greater than noise level (or 'noise floor') (26). Any portion of the analog signal (24) below the 'noise floor' (26) is lost information. The noise limits the sensitivity of the sensor system to the level of the noise floor. Some systems go to great lengths to reduce the noise level to acquire better sensitivity. An example is cryogenic cooling. Although it achieves good sensitivity, it is complex, costly, cumbersome and dangerous.

Figure 21:
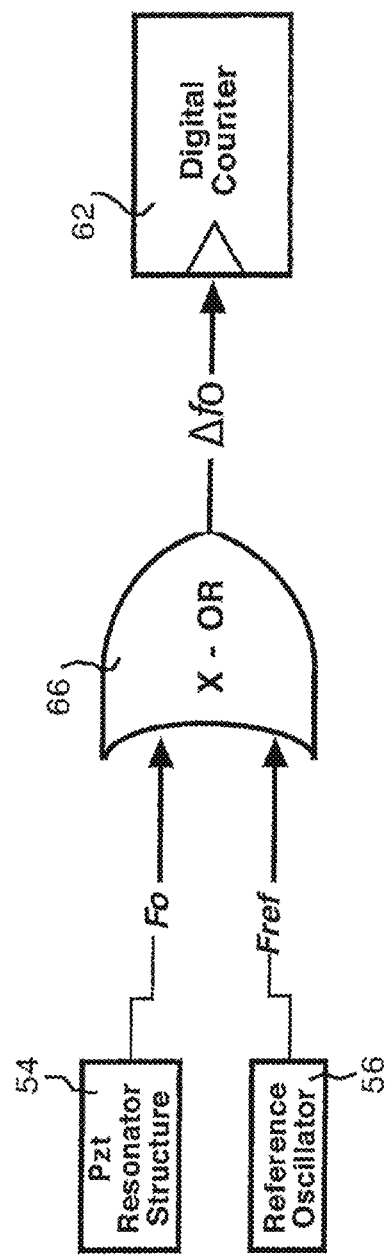
FIG. 21 is a block diagram that illustrates another exemplary embodiment of a pixel unit and pixel circuitry, which can be implemented in the imager system of FIG. 20.

One advantage of digital electronics is that data can be transmitted with the greatest amount of immunity to noise as possible. An analog signal (22) as shown in FIG. 21 is susceptible to noise because small changes in the signal data may be smaller in amplitude than the systems noise level or noise floor, which masks that part of the analog signal (so it is lost). This is a major limiting factor to any systems overall sensitivity and performance. In FIG. 19, the analog signal (22) can be converted to a series of binary numbers (logic 1 and logic 0). These binary numbers are represented by square waves (23) that modulate between the systems voltage low point and high point. To be detected, the square waves need only switch above or below the system transition level (21) to be valid data. Digital design enables acquisition of valid data by using the leading or falling edge of the square wave signal. This trigger point is discernible even in high noise environments. So it is a clear advantage to have the systems data be digital at the earliest possible time in the data creation scheme. In the exemplary detector schemes discussed herein, a passive detector member is implemented, as it is more noise immune than active circuitry.

Figure 20:
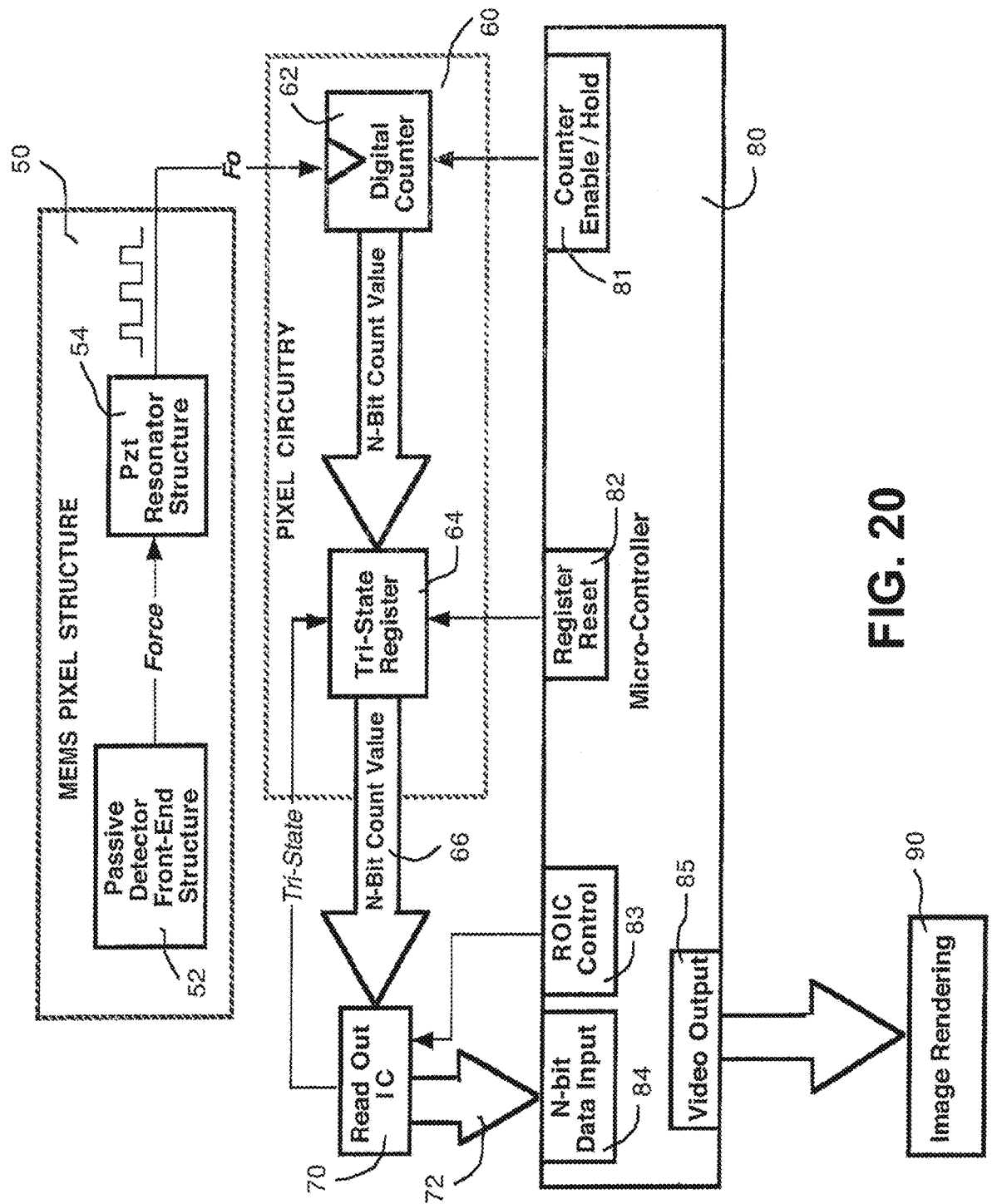
FIG. 20 is a block diagram of an imager system based on passive detectors, according to an exemplary embodiment of the invention.

FIG. 20 is a block diagram of an imager system implementing passive detectors, according to an exemplary embodiment of the invention. In general, FIG. 20 shows an imager circuit comprising a pixel structure (50), pixel circuitry (60), a read out integrated circuit (70) ("ROIC"), a controller (80), and an image rendering system (90). The pixel (50) comprises a passive detector front-end structure (52) and a resonator structure (54). The pixel circuitry (60) comprises a digital counter (62) and a tri-state register (64). The controller (80) comprises a counter enable/hold control block (81), a register reset block (82), an ROIC control block (83), a data input control block (84), and a video output control block (85).

In the pixel structure (50) of FIG. 20, the passive detector front-end structure (52) generically represents any one of the passive pixel detector structures discussed herein, including the support structures and detector elements that are designed to be mechanically distorted in response to photon exposure, for example, and apply mechanical stress (force) to the resonator structure (54). The detector front-end structure (54) is electrically passive and has no noise generating electronics.

The resonator structure (54) oscillates at a resonant frequency $F_o$ and outputs a square wave signal. The resonator structure (54) is designed to have a reference (or base) resonant frequency (no photon exposure) in a state in which no additional stress, other than the pre-stress amount, is applied to the resonator structure (54) by the detector front-end (52) due to photon exposure. As mechanical stress is applied to the resonator member (54) from the detector front-end (52) due to photon exposure, the oscillating frequency of the resonator member (54) will increase from its reference (base) resonant frequency. In one exemplary embodiment, the digital circuits (60), (70) and (80) collectively operate to determine the output frequency $F_o$ of the resonator member (54) due to the force exerted on the resonator member (54) by the expansion and contraction of a passive detector element (e.g., ribbon, plate) of the detector front end structure (52), determine an amount of incident photonic energy absorbed by the passive detector element based on the determined resonant frequency $F_o$ of the resonator member (54) at a given time, and generate image data based on the determined amount of incident photonic energy at the given time, which is then rendered by the imaging system (90).

In particular, the output signal generated by the resonator member (54) is a digital square wave signal having a frequency $F_o$ that varies depending on the stress applied to the resonator member (54) by the passive detector front-end structure (52). The output signal generated by the resonator member (54) is input to a clock input port of the digital counter (62). For each read cycle (or frame) of the imager, the digital counter (62) counts the pulses of the output signal from the resonator member (54) for a given "counting period" (or reference period) of the read cycle. The counting operation of the digital counter (62) is controlled by a CLK enable signal generated by the counter control block (81) of the controller (80). For each read cycle, the count information generated by the counter (62) is output as an n-bit count value to the tri-state register (64).

The ROIC 70 reads out the count value (pixel data) from the pixel circuitry (60) of a given pixel (50) for each read cycle. It is to be understood that for ease of illustration, FIG. 20 shows one pixel unit (50) and one corresponding pixel circuit (60), but an imager can have a plurality of pixel units (50) and corresponding pixel circuits (60) forming a linear pixel array or a 2D focal plane pixel array, for example. In this regard, the ROIC (70) is connected to each pixel circuit (60) over a shared n-bit data bus (66), for controllably transferring the individual pixel data from the each pixel counting circuit (60) (which is preferably formed in the active silicon substrate surface under each corresponding pixel structure (50)) to the controller (80).

In particular, in response to control signals received from the ROIC control block (83) of the controller (80), the ROIC (70) will output a tri-state control signal to the pixel circuitry (60) of a given pixel (50) to read out the stored count data in the shift-register (64) onto the shared data bus (66). The shift-register (64) of each pixel circuit (60) is individually controlled by the ROIC (70) to obtain the count data for each pixel at a time over the data bus (66). The count data is transferred from the ROIC (70) to the controller (80) over a dedicated data bus (72) connected to the n-bit data input control block (84) of the controller (80). After each read cycle, the tri-state register (64) of each pixel will be reset via a control signal output from the register reset control block (82) of the controller (80).

The controller (80) processes the count data obtained from each pixel in each read cycle (or video frame) to determine the amount of incident photon exposure for each pixel and uses the determined exposure data to create a video image. The video data is output to an image rendering system (90) via the video output block (85) to display an image. In some embodiments of the invention where the counter (62) for a given pixel (50) obtains count data for the given pixel (50) by directly counting the output frequency generated by the resonator member (54), the controller (80) will use the count data to determine a grayscale level for the pixel, which corresponds to the amount of the incident photonic exposure of the pixel. For example, in some embodiments, the grayscale level can be determined using a grayscale algorithm or using a lookup table in which the different grayscale values (over a range from black to white) are correlated with a range of count values for a priori determined increments of changes in the oscillating frequency of the resonator member from the base reference frequency to a maximum oscillating frequency. The maximum oscillating frequency is the highest frequency that can output from the resonator member in response to the maximum amount of stress force that can be created by the given passive detector front-end structure.

In other embodiments of the invention, the pixel structure and pixel circuitry of FIG. 20 can be modified such that the counter will count the frequency of a signal that represents the difference between the base resonant frequency of the resonator member (54) and the actual output frequency generated by the resonator member (54) at a given time in response to stress applied by the passive detector front-end (52). For example, FIG. 21 illustrates another exemplary embodiment of a pixel unit and pixel circuitry that can be implemented in the imager system of FIG. 20. In FIG. 21, the pixel (50) (of FIG. 20) is modified to include a reference oscillator (56) that outputs a reference resonant frequency $F_{ref}$. The pixel circuitry (60) (of FIG. 20) is modified to include an exclusive-Or gate (66) that receives as input, the output signal of the resonator member (54) (having a variable frequency Fo) and the fixed signal from the reference oscillator (56). The X-Or gate (66) operates to remove the base frequency component of the signal Fo output from the resonator member (54) based on the reference frequency of the reference oscillator (56) and outputs a square wave signal having a frequency equal to the change $\Delta F_o$ in frequency of resonator member (54). The $\Delta F_o$ frequency signal, which is much lower in frequency than the oscillating frequency Fo of the resonator member (54), requires a lower bit number counter (62) to count the $\Delta F_o$ signal, making it simpler to implement. As with the embodiment of FIG. 20, the $\Delta F_o$ signal is counted for a reference period and the count value is used to determine incident photon exposure of the pixel, as discussed above.

Although exemplary embodiments have been described herein with reference to the accompanying drawings for purposes of illustration, it is to be understood that the present invention is not limited to those precise embodiments, and that various other changes and modifications may be affected herein by one skilled in the art without departing from the scope of the invention.

What is claimed is:

1. A thermal infrared (IR) imager, comprising:
a substrate comprising a plurality of different levels of concentric step structures that are disposed at different heights to emulate a spherical surface, wherein each concentric step structure comprises at least one thermal IR detector formed thereon to provide a spherical array of thermal IR detectors; and
read-out integrated circuitry connected to the array of thermal IR detectors to read-out signals generated by the array of thermal IR detectors to generate a thermal infrared image.

2. The thermal IR imager of claim 1, wherein the concentric step structures are square-shaped concentric step structures which emulate a convex shaped spherical surface.

3. The thermal IR imager of claim 1, wherein the concentric step structures are circular-shaped concentric step structures which emulate a convex shaped spherical surface.

4. The thermal IR imager of claim 1, wherein the concentric step structures are square-shaped concentric step structures that emulate a concave shaped spherical surface.

5. The thermal IR imager of claim 1, wherein the concentric step structures are circular-shaped concentric step structures that emulate a concave shaped spherical surface.

6. The thermal IR imager of claim 1, wherein each thermal IR detector comprises:
a piezoelectric resonator configured to generate an output signal having a frequency or period of oscillation;
an unpowered detector, wherein the unpowered detector is configured for photon exposure, wherein the unpowered detector comprises a material having a thermal coefficient of expansion that causes the unpowered detector to distort due to said photon exposure, wherein the unpowered detector is further configured to apply a mechanical force to the piezoelectric resonator due to said distortion of the unpowered detector, and cause a change in the frequency or period of oscillation of the output signal generated by the piezoelectric resonator due to said mechanical force applied to the piezoelectric resonator;
wherein the unpowered detector substantially or completely covers the piezoelectric resonator to minimize or prevent photon exposure of the piezoelectric resonator; and
digital circuitry configured to (i) determine the frequency or period of oscillation of the output signal generated by the piezoelectric resonator as a result of the mechanical force applied to the piezoelectric resonator by the unpowered detector, and to (ii) determine an amount of said photon exposure based on the determined frequency or period of oscillation of the output signal generated by the piezoelectric resonator.

7. The thermal IR imager of claim 6, wherein each thermal IR detector further comprises a thermal insulator configured to thermally insulate the piezoelectric resonator from the unpowered detector.

8. A camera comprising:
a thermal infrared (IR) imager, wherein the thermal IR imager comprises:
a substrate comprising a plurality of different levels of concentric step structures that are disposed at different heights to emulate a spherical surface, wherein each concentric step structure comprises at least one thermal IR detector formed thereon to provide a spherical array of thermal IR detectors; and
read-out integrated circuitry connected to the array of thermal IR detectors to read-out signals generated by the array of thermal IR detectors to generate a thermal infrared image.

9. The camera of claim 8, wherein the concentric step structures are square-shaped concentric step structures which emulate a convex shaped spherical surface.

10. The camera of claim 8, wherein the concentric step structures are circular-shaped concentric step structures which emulate a convex shaped spherical surface.

11. The camera of claim 8, wherein the concentric step structures are square-shaped concentric step structures that emulate a concave shaped spherical surface.

12. The camera of claim 8, wherein the concentric step structures are circular-shaped concentric step structures that emulate a concave shaped spherical surface.

13. The camera of claim 8, wherein each thermal IR detector comprises:
   a piezoelectric resonator configured to generate an output signal having a frequency or period of oscillation;
   an unpowered detector, wherein the unpowered detector is configured for photon exposure, wherein the unpowered detector comprises a material having a thermal coefficient of expansion that causes the unpowered detector to distort due to said photon exposure, wherein the unpowered detector is further configured to apply a mechanical force to the piezoelectric resonator due to said distortion of the unpowered detector, and cause a change in the frequency or period of oscillation of the output signal generated by the piezoelectric resonator due to said mechanical force applied to the piezoelectric resonator;
   wherein the unpowered detector substantially or completely covers the piezoelectric resonator to minimize or prevent photon exposure of the piezoelectric resonator; and
   digital circuitry configured to (i) determine the frequency or period of oscillation of the output signal generated by the piezoelectric resonator as a result of the mechanical force applied to the piezoelectric resonator by the unpowered detector, and to (ii) determine an amount of said photon exposure based on the determined frequency or period of oscillation of the output signal generated by the piezoelectric resonator.

14. The camera of claim 13, wherein each thermal IR detector further comprises a thermal insulator configured to thermally insulate the piezoelectric resonator from the unpowered detector.

15. An imager, comprising:
   a substrate comprising a plurality of different levels of concentric step structures that are disposed at different heights to emulate a spherical surface, wherein each concentric step structure comprises at least one photon detector formed thereon to provide a spherical array of photon detectors; and
   read-out integrated circuitry connected to the array of photon detectors to read-out signals generated by the array of photon detectors to generate an image.

16. The imager of claim 15, wherein the concentric step structures are square-shaped concentric step structures which emulate a convex shaped spherical surface.

17. The imager of claim 15, wherein the concentric step structures are circular-shaped concentric step structures which emulate a convex shaped spherical surface.

18. The imager of claim 15, wherein the concentric step structures are square-shaped concentric step structures that emulate a concave shaped spherical surface.

19. The imager of claim 15, wherein the concentric step structures are circular-shaped concentric step structures that emulate a concave shaped spherical surface.

* * * * *